United States Patent [19]

Braun et al.

[11] 4,266,175

[45] May 5, 1981

[54] SECONDARY THYRISTOR CONTROL FOR AC WOUND ROTOR MOTORS

[75] Inventors: Dennis H. Braun, Brookfield; Robert W. Spink, Wauwatosa, both of Wis.

[73] Assignee: Eaton Corp., Cleveland, Ohio

[21] Appl. No.: 78,063

[22] Filed: Sep. 24, 1979

[51] Int. Cl.³ .............................................. H02P 1/40
[52] U.S. Cl. ................................... 318/758; 318/765; 318/821
[58] Field of Search ............... 318/757, 758, 765, 766, 318/821–828

[56] References Cited

U.S. PATENT DOCUMENTS

| | | |
|---|---|---|
| 3,375,433 | 3/1968 | Haggerty et al. |
| 3,506,900 | 4/1970 | Neuffer et al. |
| 3,529,224 | 9/1970 | Bedford |
| 3,657,622 | 4/1972 | Reuland et al. |
| 3,810,253 | 8/1974 | Vergara et al. |
| 3,969,659 | 7/1976 | Thode |
| 4,065,704 | 12/1977 | Bailey |

OTHER PUBLICATIONS

*A Variable Speed Induction Motor Using Thyristors in the Secondary Circuit,* P. R. Basu, IEEE, vol. PAS-20, Mar./Apr. 1971, pp. 509–514.
*Electronic Control System Applied to the Rotor of Asynchronous Motors for Hoist Systems,* Telemecanique (Portuguese).

*Primary Examiner*—Gene Z. Rubinson
*Attorney, Agent, or Firm*—Hugh R. Rather; Wm. A. Autio

[57] ABSTRACT

The control system has application to polyphase AC wound rotor motor which employ opposed parallel connected phase controlled thyristors together with series connected fixed resistors in each leg of a delta connected secondary impedance network. The line-to-line secondary terminals of the motor provide a source of polyphase variable frequency and variable amplitude AC reference signals. The variable frequency, variable voltage reference signals are converted into complementary pairs of square wave synchronization voltages. These same reference voltages are also concurrently integrated during their respective positive and negative half cycles to provide complementary pairs of constant peak amplitude, variable frequency voltages which are combined with associated ones of the aforementioned synchronization voltages to provide synchronization locks. These synchronization locks will not allow the synchronization voltages to recognize multiple sinusoidal zero crossings which appear on the original AC reference voltages due to space harmonics generated by the motor or spurious electrical noise until a time dependent on the fundamental frequency, well beyond the desired control recognized zero crossing of the fundamental waveforms. The generated synchronization voltages are additionally used for speed detection, integrator reset and gate pulse lockout. The variable frequency, variable voltage reference signals are also integrated and compared with a DC command signal to provide a ramp and pedestal type 180° gate current firing period for their associated pairs of the thyristors. The aforementioned control of the secondary thyristors is shown and described with a polyphase AC wound rotor motor as used in an industrial hoist system which additionally employs an auxiliary eddy current retarding brake. Establishment of proper directional power connection to the motor primary terminals is afforded through operation of a multiposition master controller. The master controller in certain positions in both hoist and lower direction effects shunting of the controlled thyristor and series resistors to permit the motor to run in an open loop mode. The master controller in accordance with its positioning concurrently effects changes in a speed reference voltage which is used in conjunction with the gate current firing control for the secondary thyristors. Operation of the controller also coordinates the energization of the eddy current brake in certain lower speed positions, and during plugging modes to insure smooth transition when going from lowering to hoisting modes.

15 Claims, 15 Drawing Figures

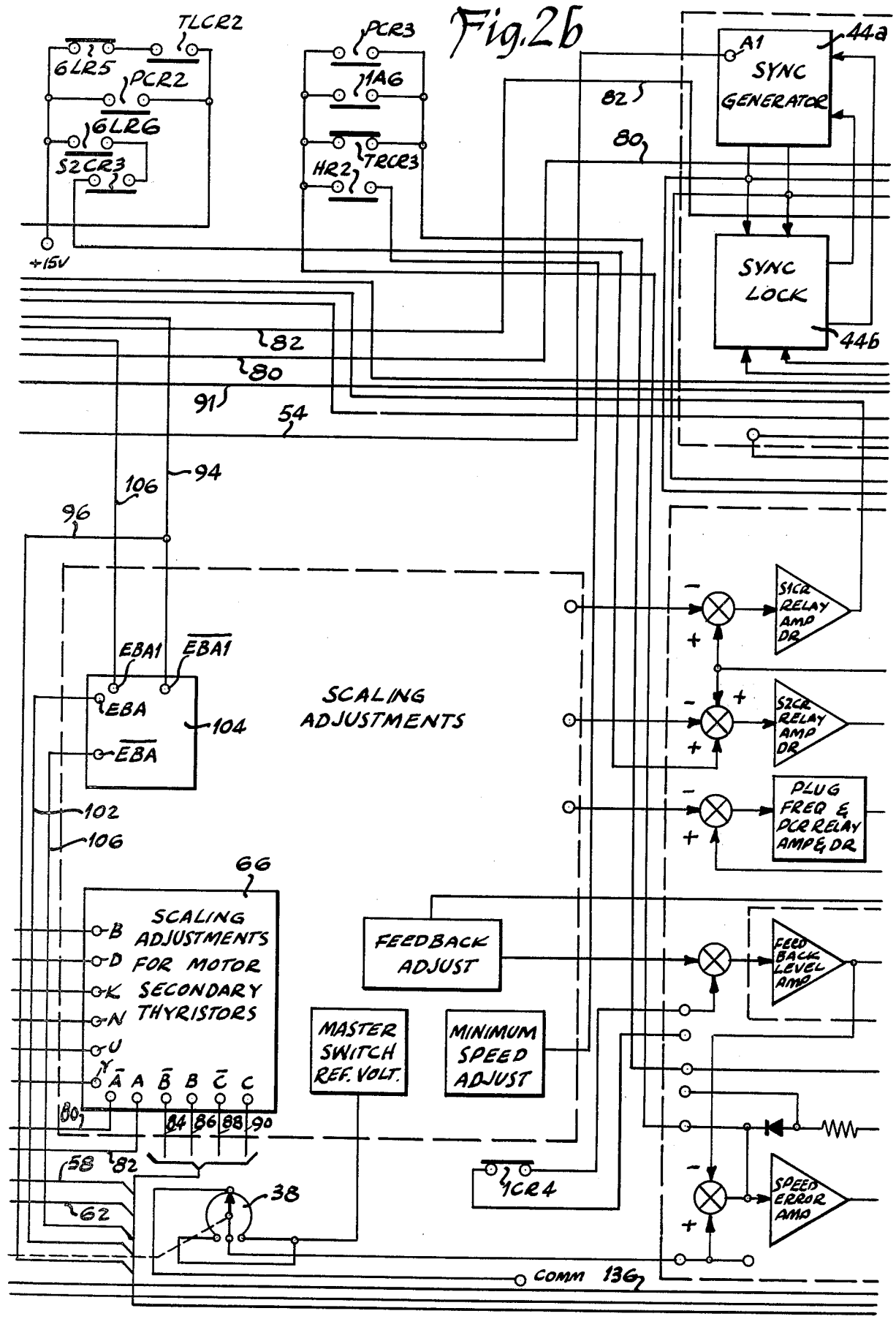

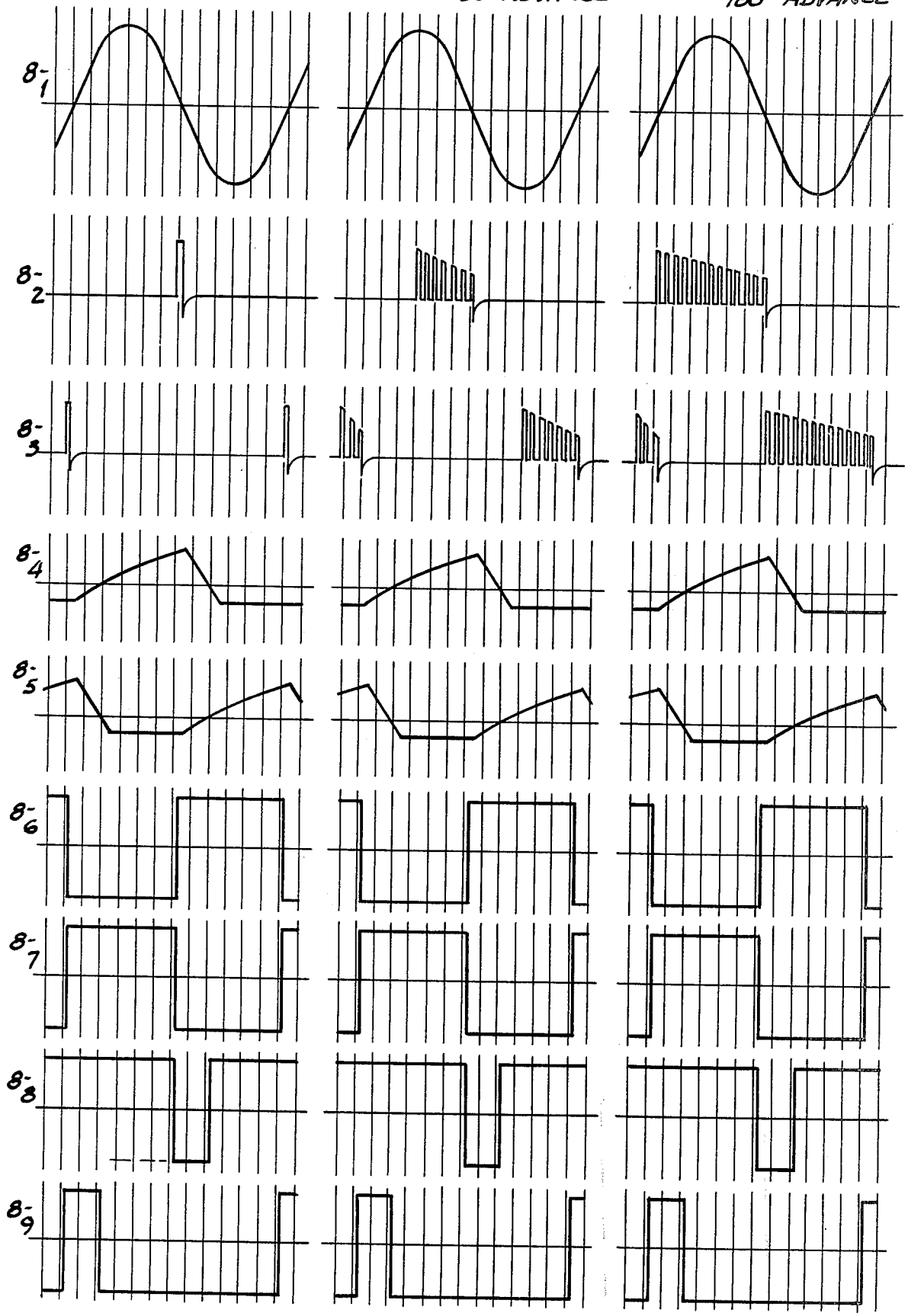

SECONDARY THYRISTOR CONTROL FOR AC WOUND ROTOR MOTORS

BACKGROUND OF THE INVENTION

It is known to use controlled thyristors, such as SCRs, in the secondary circuit of polyphase AC wound rotor motors for controlling the secondary impedance. However, their use has not gained acceptance for industrial uses in hoist drives and the like. A basic problem resides in providing stable AC reference waveforms that will be correctly timed phased to the fundamental while being insensitive to electrical noise and motor harmonics. Traditional approaches that rely on a fixed frequency AC reference using active or passive filtering techniques cannot be satisfactorily applied to the type of AC wound rotor motor secondary control.

The most suitable approach heretofore used, comprises coupling an auxiliary machine, such as a three phase synchro, directly to the shaft of the controlled motor. While this method is straight forward in developing a suitable AC firing control referenc it has a cost disadvantage and requires precise mechanical alignment with the controlled motor to assure proper synchronization of the firing gate current to the thyristors.

SUMMARY OF THE INVENTION

The control system of the present invention has application to polyphase AC wound rotor motors which employ opposed parallel connected phase controlled thyristors together with series connected fixed resistors in each leg of a delta connected secondary impedance network. The line-to-line secondary terminals of the motor provide a source of polyphase variable frequency and variable amplitude AC reference signals.

The variable frequency, variable voltage reference signals are converted into complementary pairs of square wave synchronization voltages. These same reference voltages are also concurrently integrated during their respective positive and negative half cycles to provide complementary pairs of constant peak amplitude, variable frequency voltages which are combined with associated ones of the aforementioned synchronization voltages to provide synchronization locks. These synchronization locks will not allow the synchronization voltages to recognize multiple sinusoidal zero crossings which appear on the original AC reference voltages due to space harmonics generated by the motor or spurious electrical noise until a time dependant on the fundametal frequency, well beyond the desired control recognized zero crossing of the fundamental waveforms.

The generated synchronization voltages are additionally used for speed detection, integrator reset and gate pulse lockout. The variable frequency, variable voltage reference signals are also integrated and compared with a DC command signal to provide a ramp and pedestal type 180° gate current firing period for their associated pairs of the thyristors.

The aforementioned control of the secondary thyristors is shown and described with a polyphase AC wound rotor motor as used in an industrial hoist system which additionally employs an auxiliary eddy current retarding brake. Establishment of proper directional power connection to the motor primary terminals is afforded through operation of a multi position master controller. The master controller in certain positions in both hoist and lower direction effects shunting of the controlled thyristor and series resistors to permit the motor to run in an open loop mode.

The master controller in accordance with its positioning concurrently effects change in a speed reference voltage which is used in conjunction with the gate current firing control for the secondary thyristors. Operation of the controller also coordinates the energization of the eddy current brake in certain lowering speed positions, and during plugging modes to insure smooth transition when going from lowering to hoisting modes.

The novel features which characterize the present invention are set forth in particularity in the appended claims. The invention and its manner of organization and operation can be understood by reference to the following description taken in conjunction with the accompanying drawings.

BRIEF DESCRIPTION OF THE DRAWINGS

FIGS. 2a to 2c together form a continuation of the system shown in FIGS. 1a to 1c.

FIG. 8 depicts various voltage waveforms occuring in the circuit depicted in FIGS. 3a and 3b, and FIG. 9 shows various voltage waveforms of input voltages used in the circuit shown in FIG. 4a.

DESCRIPTION OF THE PREFERRED EMBODIMENTS

The secondary of motor 10 has slip ring terminals S1 to S3. Terminal S1 is connected through the reverse parallel, phase controlled thyristors SCR1 and SCR4 and in series with the resistors 1R1 and 1R3 to terminal S2. Terminal S2 is similarly connected through the controlled thyristors SCR2 and SCR5, and series resistors 2R1 and 2R3 to terminal S3. Likewise terminal S3 is connected through the thyristors SCR3 and SCR6 and series resistors 3R1 and 3R3. As will be appreciated, the thyristor and series resistor connections just described are in a "Delta" configuration across the secondary terminal S1, S2 and S3.

Shunting contacts 1A1 to 3A1 when closed in various combinations effectively provide for shunting of SCR1–SCR4 and the resistors 1R1 to 1R3 in the secondary circuit. Similarly contacts 1A2 to 3A2 provide for shunting SCR2 –SCR5 and resistors 2R1 to 2R3. Shunting contacts 1A3 to 3A3 likewise provide for the shunting of SCR3–SCR6 and the series resistor 3R1 and 3R3. As will hereinafter be explained, contacts 1A1 to 1A3 are operated by a common electro-response contactor 1A, and contacts 2A1 to 2A3 and contacts 3A1 to 3A3 are operated by the contactors 2A and 3A respectively.

Figure 1A:
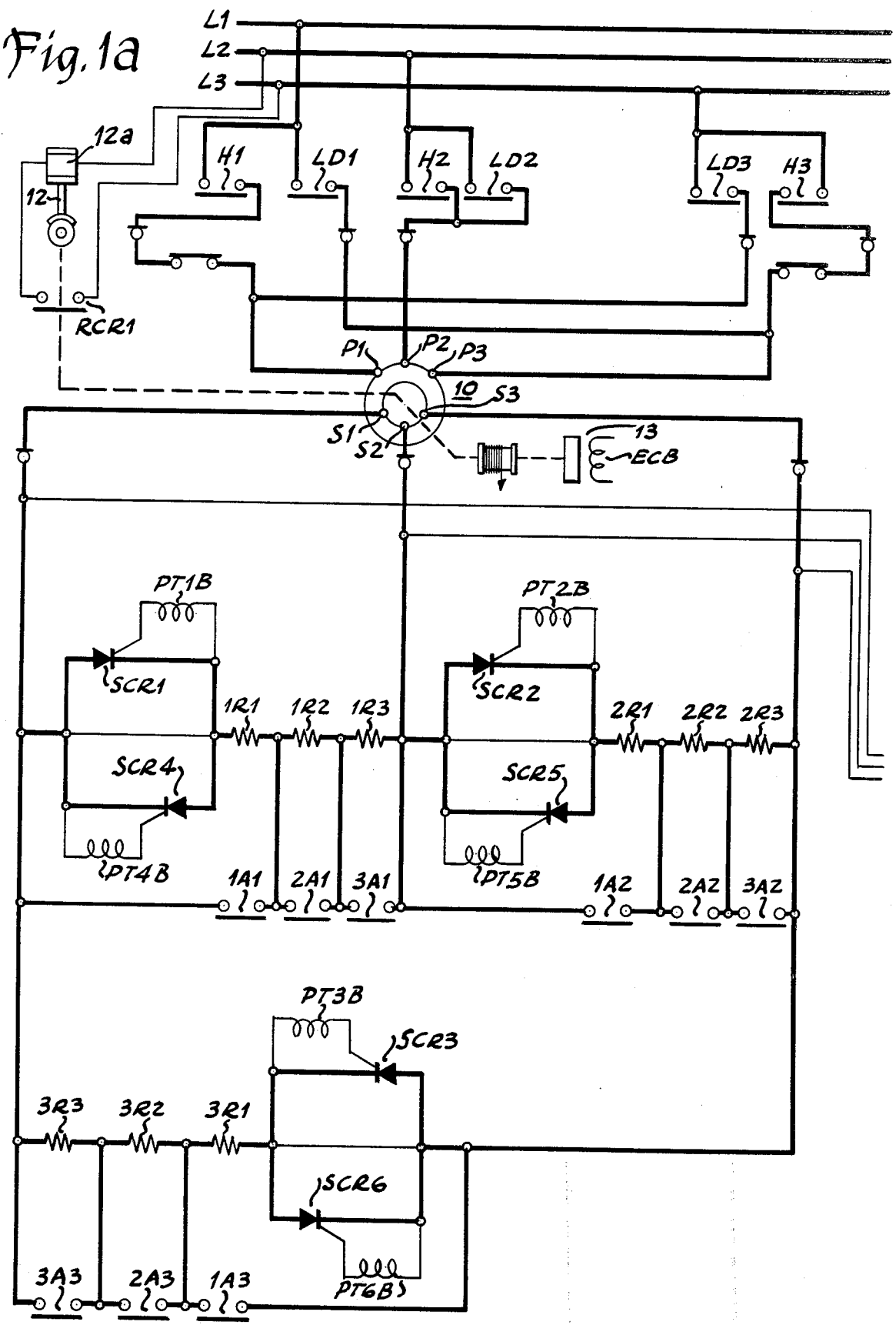
FIGS. 1a to 1c together form a diagram of a portion of a motor controlled hoisting system embodying the invention.

Referring to FIG. 1a seconday windings PT1B and PT4B of firing circuit transformers PT1 and PT4 are connected between the cathode and control electrodes of SCR1 and SCR4 respectively. Like secondary windings PT2B and PT5B are similarly connected to SCR2 and SCR5, and similar secondary winding PT3B and PT6B are in the same fashion connected to SCR3 and SCR6. A considerable part of the novelty in the present invention resides in the control of the firing of the thyristors SCR1 to SCR6 and the manner in which it is accomplished. In order to provide variable voltage, variable frequency feedback signals for such firing circuit lines 34, 35 and 36 are connected to the secondary terminal S1 to S3 respectively. The manner in which such feedback signal is used will be hereinafter explained in the description of the firing circuit control for the thyristor SCR1 to SCR6.

Figure 1B:
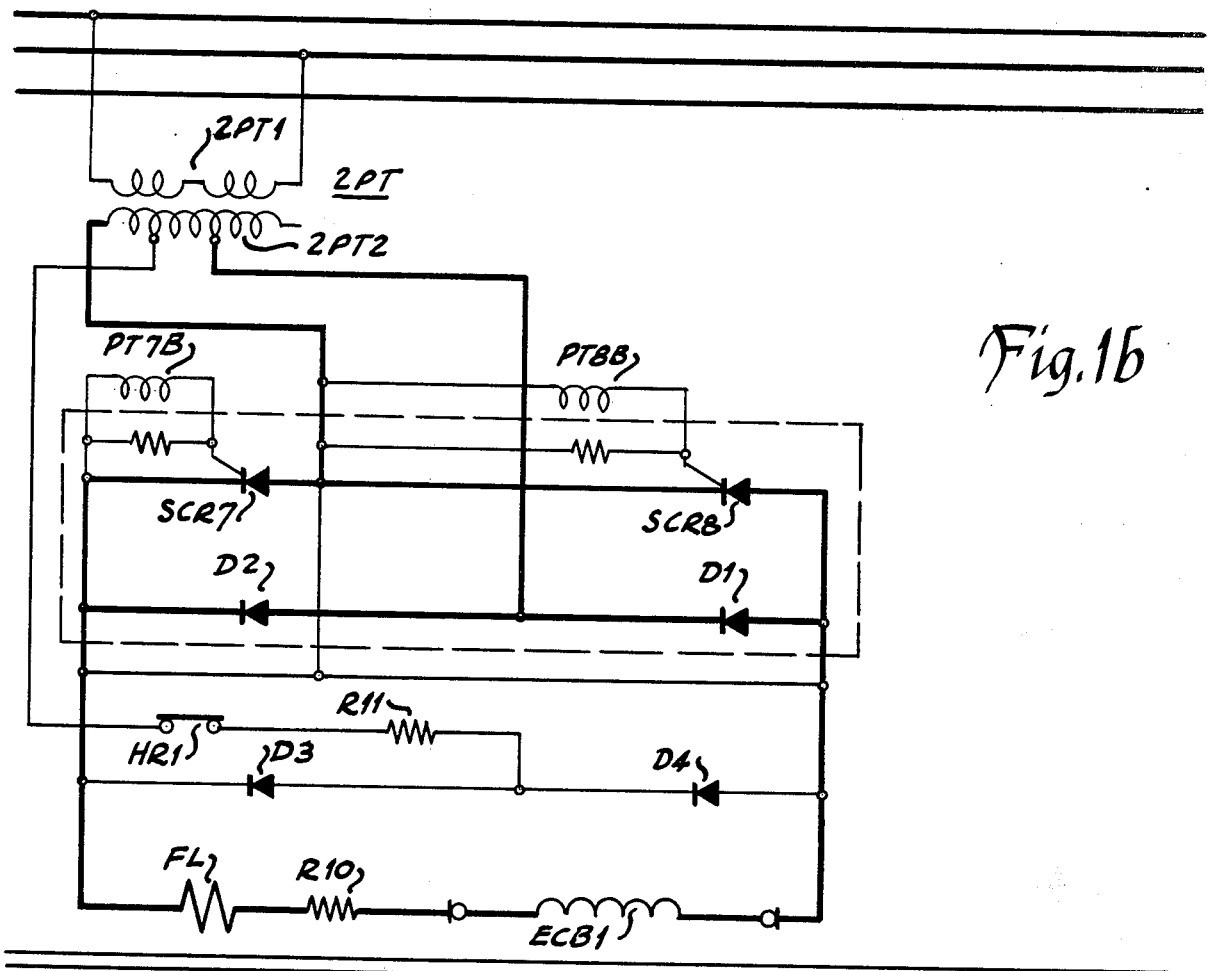

FIG. 1b discloses the circuitry for energizing the winding ECB for the eddy current brake 13. The primary winding 2PT1 of transformer 2PT is connected across A.C. lines L1 and L2. When thyristors SCR7 and SCR8 are appropriately gated, current on alternate half cycles will exist from the left end of winding 2PT2 through SCR7, field loss relay FL, resistor R10, winding ECB1 and rectifier D1 to the end half of winding 2PT2. On opposite alternate half cylces when LSCR8 is conducting, current will exist from the right end of winding 2PT2 through rectifier D2 relay FL, resistor R10, winding ECB1, and thyristor SCR8 to the left end of winding 2PT2.

With neither SCR7 nor SCR8 conducting and contacts HR1 of relay HR closed, current will only exist from an intermediate tap on winding 2PT2 through contacts HR1, resistor R11, falf wave rectifier D3, thence through relay FL, resistor R10, winding ECB1, and rectifier D1 to the right end of winding 2PT2. On alternate half cycles current will only exist from the right end of winding 2PT2 through rectifier D2, thence through FL, R10, and winding ECB1, and then through D4, resistor R11, contact HR1 to the intermediate tap on winding 2PT2. With contact HR1 closed, there will be sufficient current flowing through relay FL to energize the same for a purpose that will be later discussed.

Figure 1C:
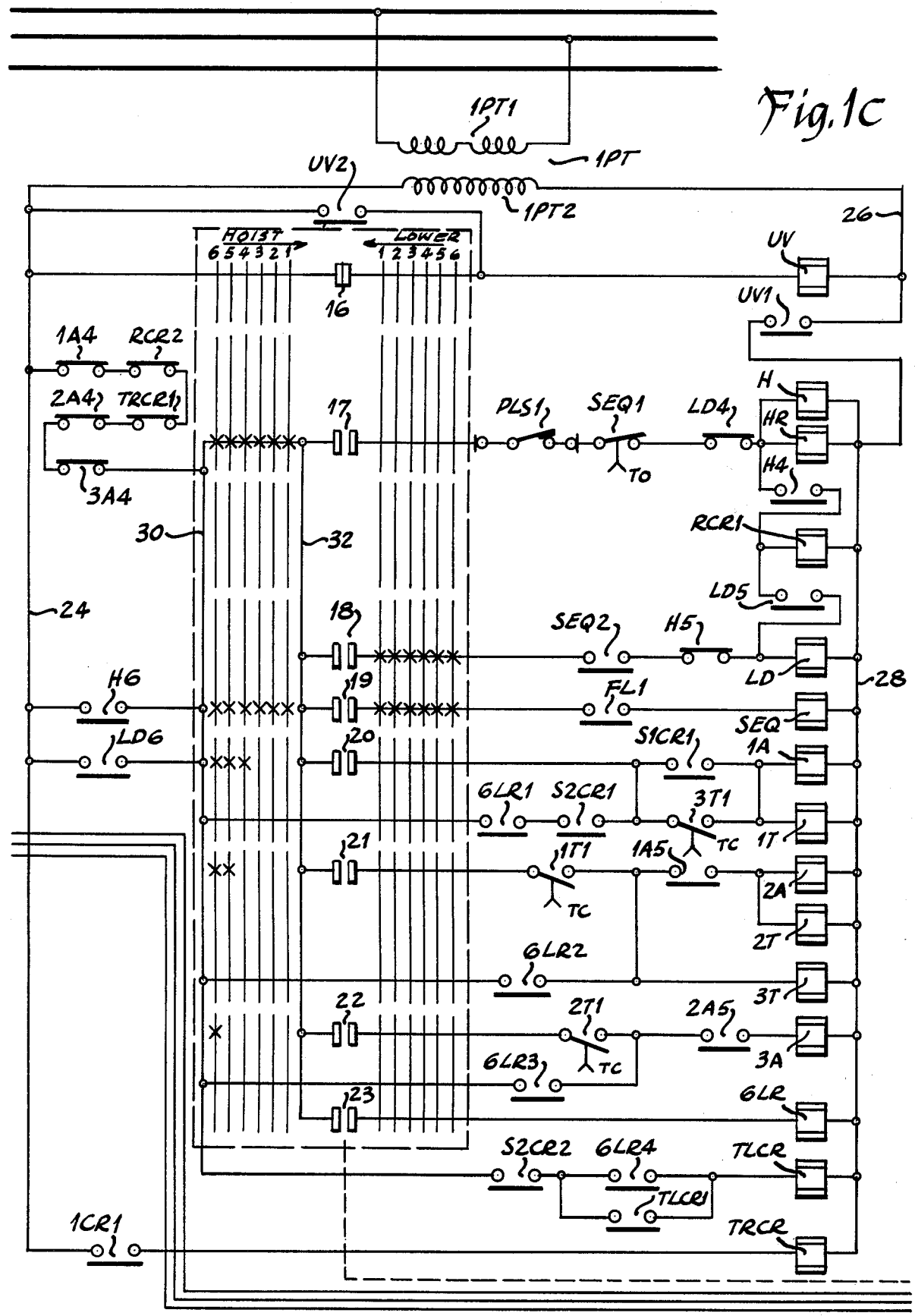

FIG. 1c shows a conventional multi position drum controller which is enclosed within the dotted line rectangle 15. Controller 15 has contacts 16 which is closed in the "off" position, and has seven contacts 17 to 23 which are all open in the "off" position and variously closed in the six "hoist" and six "lower" operating positions of controller 15. Controller 15 also has a reference potentiometer 38 (see FIG. 2b) which may be assumed to be integrally mounted on the controller shaft. As shown, each of the contacts 17 to 23 can be considered to be closed in any position depicted by an "X" there aside as shown in the drawing.

Electrical power to controller 15 is supplied through a transformer 1PT which has its primary winding 1PT1 connected to A.C. lines L1 and L2. The secondary winding 1PT2 is connected at its left end terminal to a conductor 24, and its right end terminal to a conductor 26 which in time is connected through normally open contact UV1 to a conductor 28.

With power on to transformer 1PT and controller 15 in its "off" position undervoltage relay UV will be energized across conductors 24 and 26 through the then closed contacts 16 and consequently contacts UV1 will close to complete circuit connections between conductors 26 and 28 and contacts UV2 will close to complete a maintaining circuit around contact 16 which will be open in all but the "off" position of controller 15.

The buses 30 and 32 in controller 15 are connected to conductor 24 through the then closed contacts 1A4, RCR1, TRCR1, 2A4 and 3A4 in the "off" position. Now, let it be assumed that controller 15 is operated to the 1st hoist position to close its contact 17. Circuit is then completed form bus 30 through contact PLS1 of the upper hoist limit switch, contacts SEQ1 of relay SEQ, interlock contacts LD4 of lowering contacts LD, and the energizing coils of 1 hoist contactor H, and coil of relay HR. Consequently contacts H1 to H3 shown in FIG. 1A will close to establish power connection to the stator of motor 10 for operation of the latter in the hoisting direction.

Figure 2A:
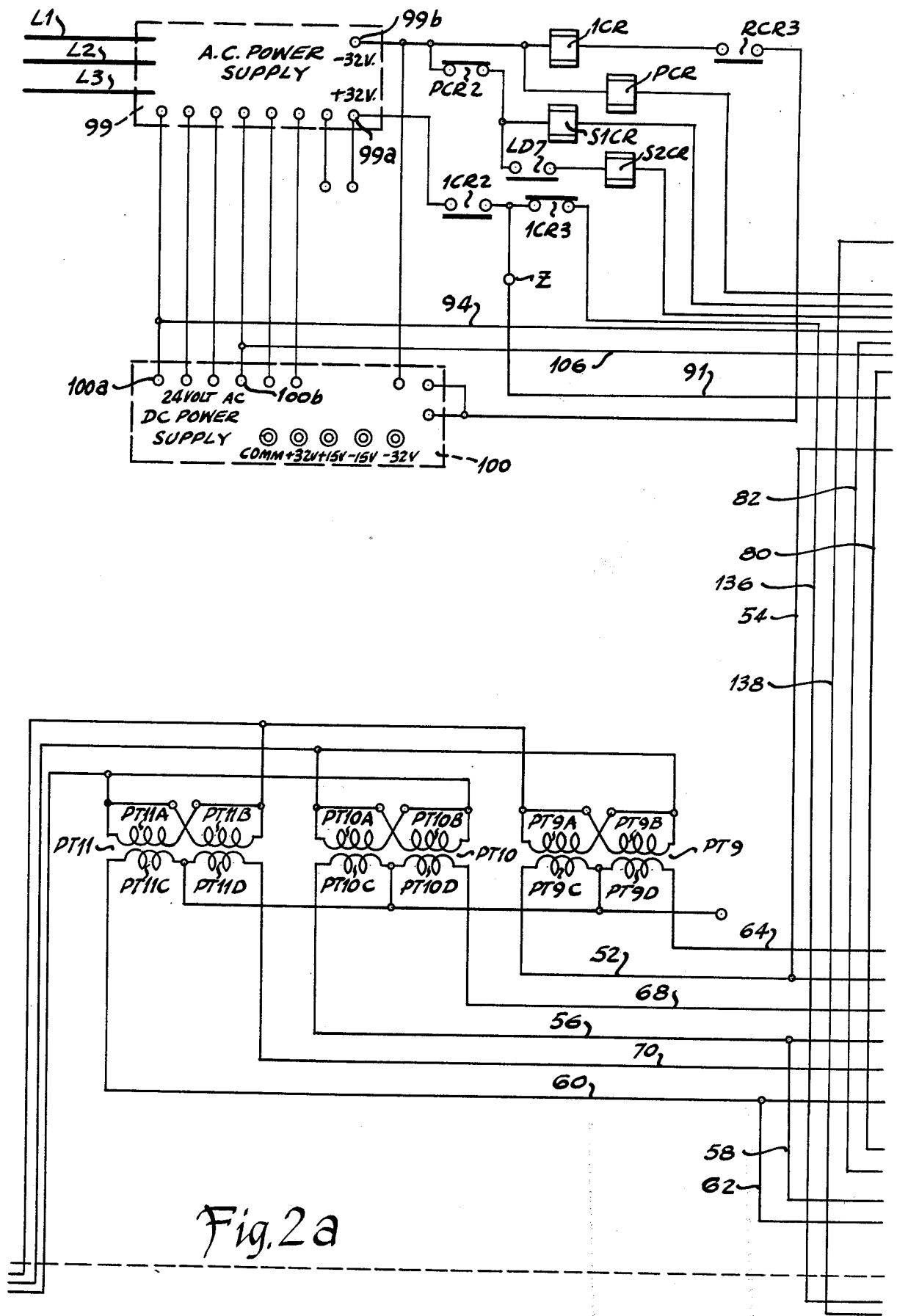

Auxiliary contacts H4 will close to complete energizing connection of the coil of relay RCR, and interlock contacts H5 will open to insure against energization of the lowering contactor LD when the control system is operated in the hoist mode. Auxiliary contacts H6 close to establish a direct connection between conductor 24 and the controller buses 30 and 32. As a result of energization of relay RCR its contact RCR1 will open and its contacts RCR2 (FIG. 2a) will close. Closure of contacts RCR2 then causes relay 1CR (FIG. 2a) to be energized resulting in closure of contacts 1CR1 and 1CR2 and opening of its contacts 1CR3 and 1CR4 (FIGS. 1c & 2a). Consequently relay TRCR is energized to open its contacts TRCR1.

The energization of relay HR causes its contacts HR1 to open thereby insuring that the winding EBC1 of eddy current brake 13 and field loss relay FL will not be energized during the hoist mode of motor operation. Thus contacts FL1 will be open preventing energization of relay SEQ.

With controller 15 in the first hoist position it will be apparent that the complete delta network of secondary impedance, including all fixed resistors and thyristors, will be effectively incircuit. As will hereinafter more fully be explained the thyristors SCR1 to SCR6, will as long as controller 15 is maintained in such first hoist position, be automatically controlled to maintain motor shaft speed below 40% rated speed.

During operation of controller 15 from the "off" to the 1st hoist position, the potentiometer 38 (FIG. 2b) is proportionately adjusted counter-clockwise to provide a change in a speed reference signal which as will hereinafter be more fully explained, causes motor 10 to run in a substantially constant speed vs. torque relationship as depicted by the curve in FIG. 5. It will be apparent that the complete delta network of secondary impedance, including all fixed resistors and thyristors are then effectively in circuit. The system functions to control the conduction of thyristor SCR1 to SCR6 automatically so that the motor torque will be sufficient to maintain the desired constant speed provided by the first hoist position.

As the controller is operated from the 1st to 2nd and all higher hoist positions the potentiometer 38 is successively adjusted further in the counterclockwise direction thereby effecting incremental proportional change in the speed reference signal. Accordingly, motor 10 will operated at proportionately higher constant speed in the hoist direction.

If the controller 15 is in the 4th hoist position and motor 10 reaches a 40% rated speed, a relay S1CR (FIG. 2b) becomes energized to close its contacts S1CR1. As contacts 20 in the controller will then be closed, a circuit will be completed from bus 32, through contacts 20 and S1CR1 and through the coils of contactor 1A and timing relay 1T to conductor 28. Contactor 1A then closes the resistor-thyristor shunting contacts 1A1 to 1A3, opens its interlock contacts 1A4 and closes its interlock contacts 1A5 and 1A6. As a result of the closure of contacts 1A1 to 1A3 it will be apparent that all of the thyristors SCR1 to SCR6 and the resistors 1R1, 2R1 and 3R1 will be effectively shunted out-of-circuit in the motor secondary delta network. Motor 10 will then, when in the 4th to 6th hoist position, operate in a conventional open loop mode.

Operation of controller to the 5th hoist position will cause contacts 21 to close and circuit will then be completed from bus 32 through the timed closed contact 1T1 of the then energized relay 1T, the then closed contacts 1A5 and the coils of contactor 2A and relay 2T to conductor 28. As a result contacts 2A1 to 2A3 in the motor secondary impedance network will be closed after a timed interval to shunt resistors 1R2, 2R2 and 3R2, thereby further reducing the secondray impedance to permit increased speed in the hoisting direction.

Finally, if the controller is operated to the 6th hoist position, contacts 22 close to complete a circuit from bus 32 through contact 22, the then time closed contacts 2T1 of the then energized relay 2T, the then closed contacts 2A5 and the coil of contactor 3A to conductor 28. Thus contacts 1A3, 2A3 and 3A3 will be closed after another timed interval to shunt the remaining resistors 1R3, 2R3 and 3R3 out of secondary resistance network to permit motor 10 to operate at maximum speeds in the hoisting direction.

It will be apparent that as the controller 15 is operated back from the 6th through the 3rd hoist operating position that the resistors 1R1–1R3, 2R1–2R3 and 3R1–3R3 and thyristors SCR1 to SCR6 will be effectively reinserted in the motor secondary impedance circuit in the reverse order previously described, and by the time the 3rd operating position is reached the motor will be again under automatic control afforded through the controlled firing of SCR1–SCR6.

When the controller is returned to the "off" position contactor H drops out to open main stator contacts H1 to H3, auxiliary contacts H4 and H6, and reclose interlock contacts H5. Consequently, relay RCR is deenergized thereby opening brake contacts RCR1 and interlock contacts RCR2 and RCR3. The holding brake 12 then sets and coil of relay 1CR is deenergized opening contacts 1CR1 to effect deenergization of relay TRCR. Contacts TRCR1 then reclose to complete the circuit with the other then reclosed contacts 1A4, RCR2, 2A4 and 3A4 from conductor 24 to controller bus 30.

Now, if controller 15 is operated to the 1st lower position contacts 18 and 19 thereof close. As contacts HR1 in the eddy current brake circuit are closed field loss relay FL will be sufficiently energized to close its contacts FL1. Thus a circuit will be completed from bus 32 in the controller through the then closed contacts FL1 and the coil of relay SEQ to conductor 28. Consequently contacts SEQ1 in the circuit to coils H and HR will time open, and contacts SEQ2 in the circuit to contactor LD will close. Thus circuit will be completed from bus 32 through then closed contacts 18, SEQ2 and H5 and through the coil of contactor LD to conductor 28. Contactor LD thereupon closes the lower directional contacts LD1 to LD3 to complete energizing of the motor stator to initiate operate of motor 10 in the lowering direction. Interlock contacts LD4 open and contacts LD5, LD6 and LD7 clos. Closure of contacts LD5 results in energization of relay RCR which closes to contacts RCR1 to effect energization of brake release winding 12a, and closes its contacts RCRS and opens its contacts RCR2. Closure of contacts LD6 completes a direct circuit between conductor 24 and the buses 30 and 32, and closure of contacts LD7 (FIG. 2a) allows the coil of relay S2CR for future energization.

With controller 15 in any of the 1st through 5th lower operating positions, the winding ECB1 of the eddy current brake will be energized to varying degrees in accordance with the load and setting of the master speed reference potentiometer 38 (FIG. 2b) and the aforementioned variable speed-frequency feedback signal derived from the motor secondary terminals. Lowering speeds for various positions of the controller 15 in any of the 1st to 5th lowering position will be in accordance with the family of straight sloping lines shown in quadrant IV of FIG. 5.

When controller 15 is operated to the 6th lower position contacts 23 closes to complete a circuit from bus 32 and the coil of relay 6LR to bus 28. Relay 6LR then picks up to close its contacts 6LR1 to 6LR4, and 6LR6 and open its contacts 6LR5. When it reaches 40% speed relay S1CR will of course be energized and when 80% speed is reached in the lowering direction relay S2CR will be energized to close its contacts S2CR1 to S2CR3. It will be apparent that contactors 1A to 3A will then close to effect an open loop control as aforedescribed with the thyristor SCR1 to SCR6 and all fixed secondary resistor effectively shunted out of the motor secondary circuit.

If the motor 10 is running in excess of 80% speed in the lowering direction with all secondary resistance effectively out of ciruit the motor will be operating in a regenerative mode in which current is pumped back into the lines L1 to L3. Now, if controller 15 is operated back from the 6th to any of the 1st to 5th lowering positions, the motor control will revert back from an open to closed loop control with the eddy current brake thyristor SCR7–SCR8 initially biased to full conducting condition to effect maximum eddy current retarding torque.

When controller 15 is moved back from its 6th to any lowered number lower position relay 6LR becomes deenergized, but relay TLCR remains energized. Thus as shown in FIG. 2b contacts 6L5 and TLCR2 will then be closed. A.D.C. bias from the 15 volt D.C. source will then be imposed through conductor 138 on the summing point 42. This, as will hereinafter be explained, results in the thyristors SCR7 and SCR8 being turned full on to provide fully eddy current brake retarding action initially in the transition to quickly decrease the motor below 80% speed.

As motor 10 decreases below 80% speed relay S2CR drops out resulting in deenergization of transition relay TLCR and consequent opening of its contacts TLCR1 and TLCR2. Opening of contacts TLCR2 interrupts the 15 volt D.C. bias imposed on the summing point 42 whereupon the control of firing of the eddy current brake thyristor SCR7 and SCR8 is placed back within regulating control as dictated by the setting of potentiometer 38 and the speed error feedback signals as will later be explained.

Figure 5:
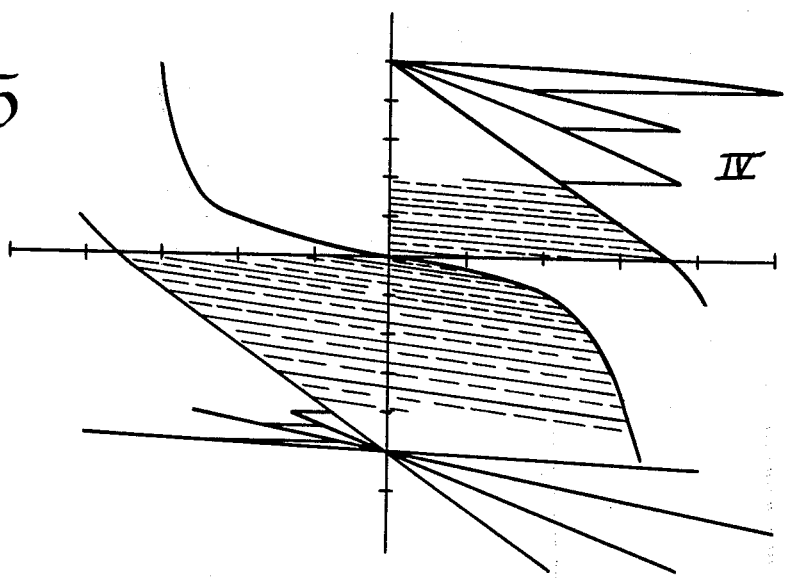
FIG. 5 depicts typical speed-torque curves provided in the operation of the system shown in FIGS. 1 to 4.

Another rather complex transition occurs when the controller 15 is operated from a lowering position when motor is operating in the quadrant IV of FIG. 5 and to a hoist operating position. This will result in a "plugging" transition made with the motor secondary frequency being considerably higher than that of the AC supply. As a consequence "plugging" relay PCR (FIG. 2a) will be energized to open its contact PCR1, thereby disabling relays S1CR and S2CR, and close its contacts PCR2 and PCR3. Closure of contacts PCR2 results in full conduction of SCR7 and SCR8 to provide full eddy current brake energization, and closure of contacts PCR3, as will hereinafter be explained, disables speed error amplifier.

When the motor 10 slows the 20% speed in the plugging direction (72 Hz secondary frequency), relay PCR drops out reenabling the speed error amplifier, and deenergization of the eddy current brake.

POWER SUPPLIES FOR ELECTRONIC AND AUXILIARY CIRCUITS

As shown in FIG. 2a A.C. power supply lines, L1, L2 and L3 connect with a power supply module 99 which has a +32 volt D.C. output terminal 99a and a −32 volt D.C. output terminal 99b. Terminal 99b is connected to relays 1CR and PCR, contacts PCR2 in series with relay 1CR, and to relay S2CR in series with contacts PCR2 and LD7. Terminal 99a is connected to contacts 1CR2 and a terminal Z, and to contacts 1CR3 in series with contacts 1CR2. Module 99 has six polyphase output terminals which are connected to corresponding input terminals of a D.C. power supply module 100. Module 100 is provided with five D.C. supply terminals providing +32 volt −32 volt, +15 volt and −15 volt, and electrical "common" terminal which may be assumed to afford these required DC voltages and return connection for the electronic circuits and auxiliaries that will hereinafter be described. Module 100 also has a second common terminal to which the contacts RCR3 are connected.

An important and novel part of the present invention resides in the firing circuit design for the pairs of secondary circuit thyristors SCR1–SCR4, SCR2–SCR5, and SCR3–SCR6 which will now be described.

FIRING CIRCUITS FOR MOTOR SECONDARY AND EDDY CURRENT BRAKE THYRISTORS

Figure 3A:
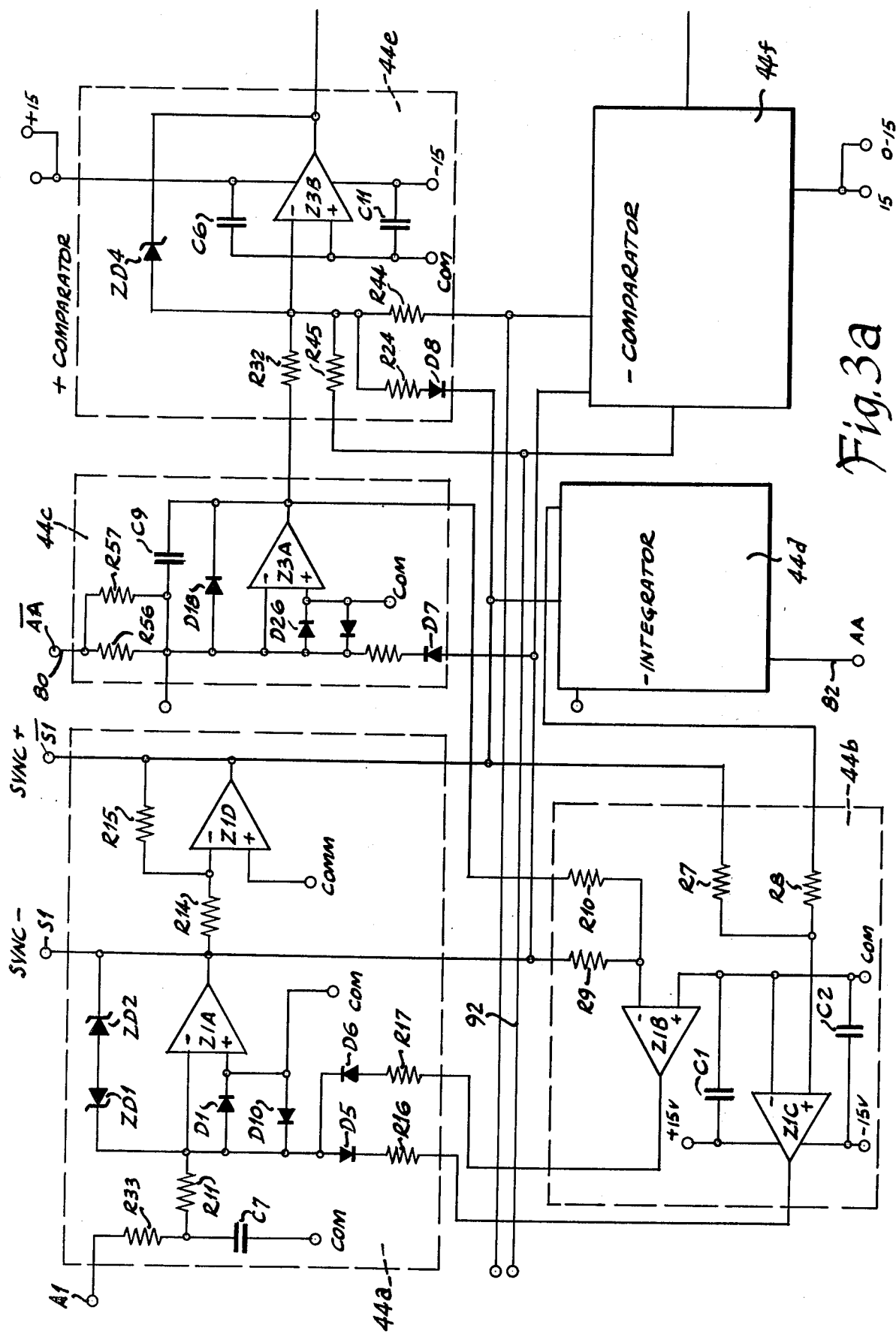
FIGS. 3a and 3b together form a diagram of showing thyristor firing control circuit portions of FIGS. 2b and2c in greater detail.
Figure 3B:
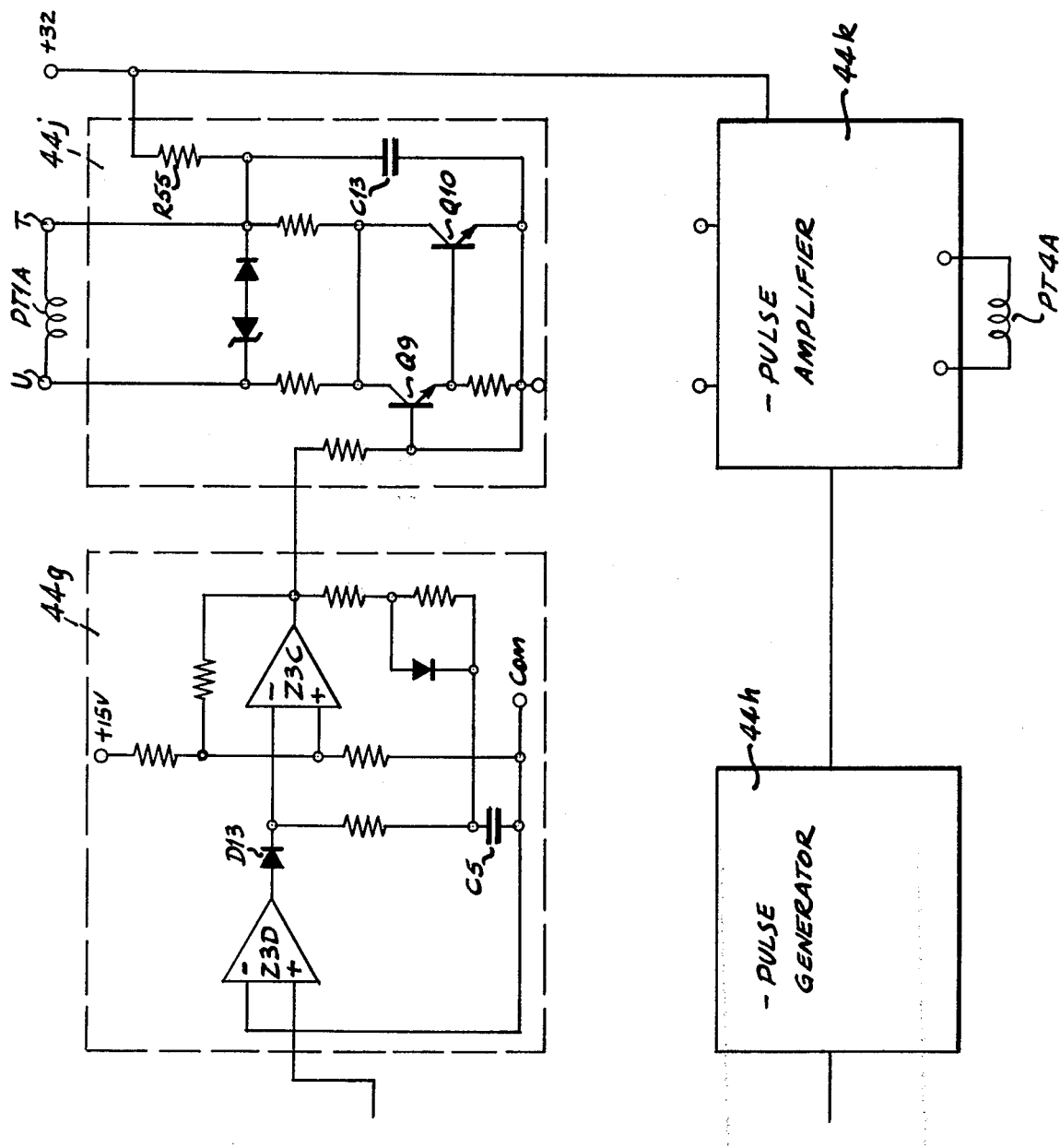

These firing circuit are shown in essentially block diagram form in 2a to 2c, and the details of one of four like firing circuit modules is shown in detailed schematic form in FIGS. 3a and 3b.

Figure 2C:
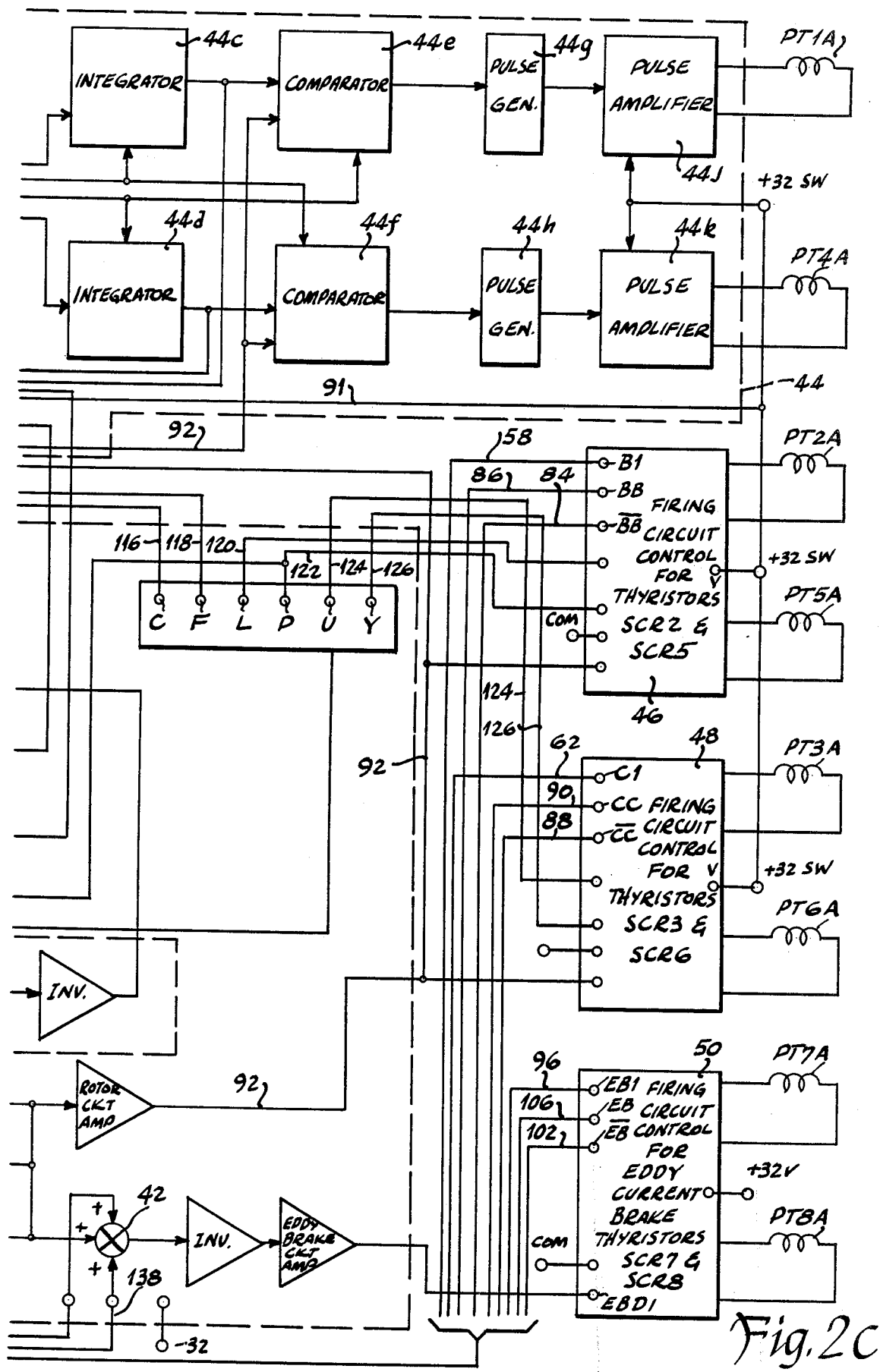

As shown in FIGS. 2b and 2c there are three firing circuit modules designated 44, 46 and 48 which control the firing currents impressed on the primary windings PT1A–PT4A, PT2A–PT5A, T3A–PT6A of the gating transformers PT1 to PT6 of the secondary thyristors. An additional firing circuit module 50 controls the firing current impressed on the primary winding PT7A and PT8A of thyristors SCR7 and SCR8 which control the energization of winding ECB1 of eddy current brake 13.

The transformers PT9 to PT11 in FIG. 2a are provided with two reconnectable primary windings and two secondary windings each. The secondary windings are connected at adjoining ends to an electronic, control common, hereinafter referred to as "common". These transformers through their connection to the secondary terminals S1 to S3 of motor 10 provide at each of their pairs of secondary windings an "in phase" and "out of phase" reference voltage proportional to the line to line voltages between the secondary terminals S1, S2 and S3.

The unscaled output from the left end secondary winding PT9C is connected through lines 52 and 54 to the input terminal A1 of firing circuit module 44a, the corresponding end of secondary winding PT10C is connected through lines 56 and 58 to input terminal B1 of firing circuit module 46, and the corresponding end secondary winding PT11C is connected through lines 60 and 62 to terminal C1 of firing circuit module 48. A line 64 connects the right end of secondary winding PT9D to the terminal B of a scaling module 66, which is shown in detail in FIG. 6, and the line 52 connected to the left end of secondary winding PT9C is also connected to terminal D of module 66. The lines 56 and 68 connect the left and right ends of secondary windings PT10C and PT10D respectively to the terminals K and N of module 66 and the lines 60 and 70 connect the left and right ends of the winding PT11C and PT10 D respectively to the terminals Y and U on module 66.

Figure 6:
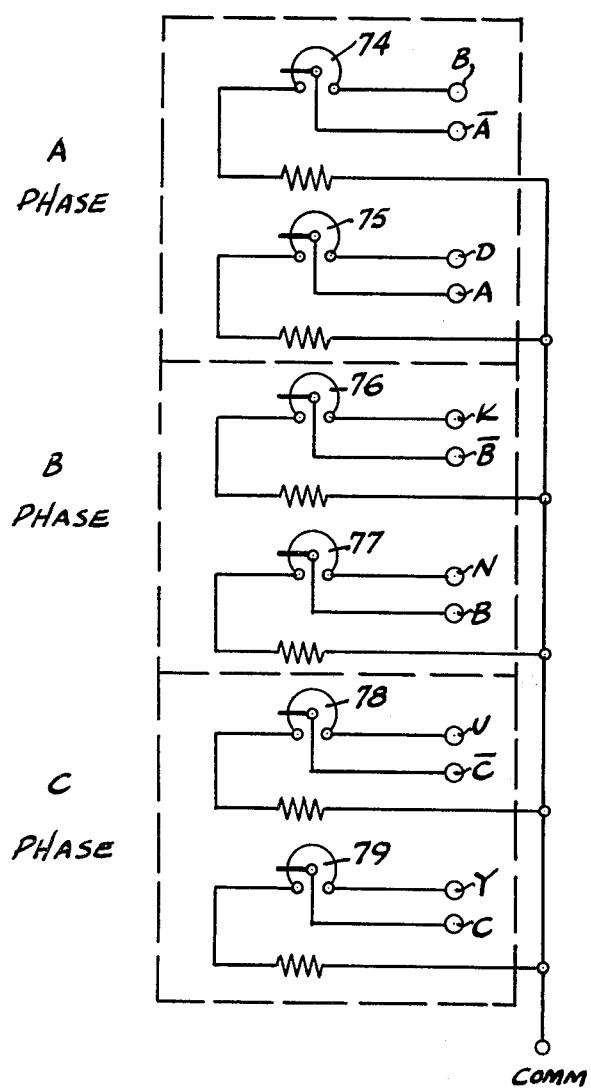
FIG. 6 is a diagram of the details of a voltage sealing adjustment used in a portion of the system shown in FIGS. 2b and 2c.

In accordance with the individual adjustment of potentiometers 74 to 79 in FIG. 6 scaling module 66, scaled AC voltages are provided at terminals $\overline{A}$ and A, $\overline{B}$ and B and $\overline{C}$ and C of module 66. Terminal $\overline{A}$ is connected through line 80 to the terminal AA on module 44c, and terminal A is connected through a line 82 to the corresponding terminal $\overline{AA}$ on module 44d. Terminals $\overline{B}$ and B are connected through the lines 84 and 86 respectively to the terminals $\overline{BB}$ and BB on firing circuit module 46, and terminals $\overline{C}$ and C are respectively connected through lines 88 and 90 to terminals $\overline{CC}$ and CC on firing circuit module 48.

The scaling adjustments afforded by the adjustable potentiometers in module 66 are necessary to provide a one time calibration of the control with the base secondary voltage of the particular motor with which it is used. In a preferred embodiment these scaling adjusted together with the transformer PT9, PT10 and PT11 provide for a range of base secondary voltages from 100 to 400 volts RMS.

Referring to the firing circuit module 44 in FIGS. 3a–3b, the SYNC generator portion 44a serves as the master clock of the firing circuit control. The terminal A1 is the unscaled input terminal to the SYNC generator and is given a phase shift of approximately 356 micro seconds (7.7° @ 60 Hz) through the resistor capacitor network of R33, R11 and C7 to eliminated the disturbance of any ultra high frequency line transients. This phase shifted variable amplitude, variable frequency signal is transformed into a fixed amplitude, variable frequency waveform by means of operational amplifier Z1A and zener diodes ZD1 and ZD2. The output of Z1A is referred to as SYNC is shown in waveform 8–6 in FIG. 8.

The output of Z1A is fed into operational amplifier Z1D which with resistors R14 and feedback resistor 15 provide an inverted SYNC + output which in FIG. 8 are waveforms 8–7. Referring to waveforms 8–1 and 8–9 FIG. 8 as the line to line voltage passes from minus to plus at the first zero crossing, the output of Z1A, waveforms 8–6 will change from +9.6 volts to −9.6 volts. Thus Z1A is a line to line voltage zero crossing detector.

In the present invention the SYNC generators detect true line to line voltage zero crossings of the fundamental motor secondray line to line voltages and reject harmonic zero crossings. Thus it is required that the SYNC generators be inhibited or prevented from recognizing more than one zero crossing until a given amount of time, dependent on the fundamental frequency, after a sync generator has recognized a zero crossing. The time to allow the sync generators to again be able to respond to a desired zero crossing is, however, variable because of the variable frequency of the motor secondary. This inhibiting of the sync generator is accomplished by the "sync lock" function of the firing circuit which will now be described.

SYNC LOCK

The portion depicted in the line rectangle 44b shows the circuit portion providing the sync lock function. It comprises operational amplifier Z1B and Z1C which are connected in an open loop, high gain comparison circuit. Amplifier Z1B compares a current proportional to the SYNC-voltage waveforms 8-6 with a current proportional to the output voltage of INTEGRATOR +, (portion 44c of FIG. 3a), which is waveform 8-4 in FIG. 8.

Amplifiers Z1B and Z1C will either be at plus or minus saturation voltage depending on their inputs. Amplifier Z1B (+lock) is only used to inhibit the sync generator function when its output is plus because of diode D6, and amplifier Z1C is only used to inhibit when its output is minus due to diode D5.

Amplifier Z1B will switch to + saturation when the sync generator SYNC − changes from plus to minus because at that time INTEGRATOR + is at or near zero voltage. As the INTEGRATOR +voltage waveforms 8-4 increases the switching threshold of Z1B is reached which occurs at approximately 3.7 volts, and Z1B switches from plus to minus saturation. During the interval when Z1B was a plus saturation, the amplifier Z1A of the sync generator was receiving two signals at its invert terminal; the normal line to line unscaled AC input at terminal A1 and the SYNC LOCK output from Z1B. Therefore, Z1A is locked into a minus output until the synch lock output of Z1B changes back from plus to minus saturation.

The SYNC LOCK in the preferred embodiment has been set empirically at 75 electrical degrees (3.5 milliseconds @ 60 Hz). In other words, the sync lock function will not allow the sync generator to recognize a zero crossing until 75° of the period of the voltage waveform after the sync has recognized a previous zero crossing. Since the INTEGRATOR +output is a time relay function with respect to the fundamental motor secondary frequency, this Sync Lock inhibit period will vary with frequency but will stay fixed in electrical degrees with respect to the period of the waveform.

The amplifiers Z1B and Z1C work together to inhibit sync generator Z1A; amplifier Z1B for the minus to plus zero crossing of the phase line to line voltage and amplifier Z1C for the plus to minus zero crossing. Amplifier Z1C uses the complementary output signals from amplifier Z1D (Sync +), and the INTEGRATOR − output from the integrator 44d to determine its proper polarity and threshold point. The integrators and their function will now be described.

INTEGRATORS

The integrators 44c and 44d provide the AC reference to which a DC voltage level can be compared to provide balanced time phase gating pulses. The main input to integrator 44c (INTEGRATOR +) is from the scaled AC line 80 to terminal $\overline{AA}$. That AC input is integrated by amplifier Z3A using capacitor C9 in its feedback and resistors R56 and R57 as the input resistors into the invert input of the amplifier. The integrator is thus measuring the area under the scaled AC input voltage waveform (when it is minus) and accordingly Z3A will reach its maximum output 90° in time as shown by waveform 8-4 of FIG. 8. The output of the integrator always follows the fundamental frequency of the scaled AC input voltage. If this input voltage is considered as a sine wave function, the integrator output can be considered as an offset cosine wave during one half of each of its period, which is the half when comparison between it and the DC voltage input is being made.

During the time when the scaled AC input is negative integrator +reset signal, which is generated by the SYNC-amplifier Z1A, is also negative and disabled by the action of diode D7. When the scaled AC input becomes positive, the SYNC − signal also becomes plus, and these two signals reset the integrator 44c output in a ramp fashion until its output decreases to approximately −0.5 volts as depicted at the right hand portion of waveform 8-4, FIG. 8. At −0.5 volts diode D18 conducts and clamps the output of integrator 44c output until the next cycle occurs at which time the aforedescribed action repeats itself.

The integrator 44c (INTEGRATOR −) in circuit component and configuration is a duplicate of integrator 44c, but operates in a complementary fashion. It is provided with an AC + scaled input at its input terminal AA which is connected through line 82 to terminal A of the scaling adjust module 66. Integrator 44d also receives a SYNC + signal input from amplifier Z1D. As shown by waveform 8-5, FIG. 8, the action of integrator 44d is displaced 180° out of phase with respects to that of integrator 44c.

The output of integrator 44c is fed into a digital comparator 44e and similarly the output of complementary integrator 44d is fed with a complementary digital comparator 44f. These comparators will now be described.

DIGITAL COMPARATORS

The digital comparators 44e (comparator +) and 44f (comparator −) provide high gain comparison between the AC references and the actuating or command signal fed through line 92 which may be assumed to vary between −8.8 and +0.5 volts DC. Since all six comparators receive the same command signal, all secondary SCRs will be gated at the same angle of retard.

Considering comparator 44e, the output from amplifier Z3A of integrator 44c is compared with the DC command signal on line 92 via resistors R32 and R45. The amplifier Z3B is connected as an open loop amplifier, and is either clamped at +9.1 or −0.5 volts depending on the algebraic sum of the currents into the input terminal of Z3B. However, the voltage of the SYNC + output of amplifier Z1D is negative, the diode D8 acts to inhibit such input comparison. Thus the SCR1 will only be gated when the voltage across its anode to cathode is positive. The output voltage of comparator 44e is either at +9.1 volts SCR gating disabled, or at −0.5 volts SCR gating enabled. These voltages are provided by zener diode ZD4 in the feedback to Z3B.

The comparator 44f is similar in circuit components and configuration to comparator 44e. However, it compares the aforementioned command signal on line 92 with the output from its companion integrator 44d. In the case of comparator 44f the comparison action is inhibited whenever the SYNC — voltage from amplifier Z1A is negative. Thus the SCR2 will only be gated whenever the voltage across its anode to cathode is positive.

The output of amplifier Z3B of comparator 44e is fed into the non-inverting input of an amplifier Z3D of a pulse generator 44g, and it may be assumed that the output of corresponding amplifier in comparator 44f is fed into the non inverting input of an amplifier like amplifier Z3D in pluse generator 44h. The pulse generators will now be described.

PULSE GENERATORS

The pulse generators 44g and 44h are designed to provide for multiple pulse firing of SCR1 and SCR4 during the total interval from the initial gating point until the SCRs positive half cycle has ended. This is shown in columns B and C, waveforms 8-2 of FIG. 8 for 90° advance and full advance respectively. Multiple pulse firing was selected for three basic reasons: (1) the high harmonic content of the AC motor secondary voltages can actually cause an SCR to be reverse biased during a gating interval and thus not allow it to conduct, or it could also cause an SCR which is conducting to recover and block: (2) the variable amplitude of the AC motor secondary voltage combined with the resistance in series with the SCR could hold the SCR current below its latching current level and cause it to recover when gating is removed; and (3) the alternative of continuous gating is much more costly and less efficient.

The pulses are generated in generator 44g by amplifier Z3C running as a gated, free running oscillator. It's output will oscillate between saturation + and saturation −. The output from comparator 44e's amplifier Z3B switches from +9.1 and −0.5 volts and causes buffer amplifier Z3D to switch from SAT+ to SAT−. When 23D switches to SAT−, diode D13 blocks and permits oscillations to begin when capacitor C5 charges to its operating point. The voltage of C5 then becomes saw tooth and causes Z3C to oscillate.

Pulse generator 44h may be assumed to be like generator 44g, and receives an output from its associated comparator 44f, to effect similar output oscillation in a complementary manner. The outputs of the pulse generators 44g and 44h are fed respectively into the pulse amplifiers 44j (PULSE AMPLIFIER +) and 44k (PULSE AMPLIFIER −) which will now be described.

PULSE AMPLIFIER

The pulse amplifier 44j and 44k amplify the positive output pulses from Z3C in their respective pulse generators and provide current amplification to the primary windings PT1A and PT4A of the pulse transformers PT1 and PT4 which have secondary windings connected in the control electrode - cathode circuits of SCR1-SCR4 as shown in FIG. 1a.

Pulse amplifier 44j has the + terminal of its associated pulse transformer winding PT1A connected to a terminal T and its other end of the winding is connected to a terminal U. Rectified DC current at +32 volts is supplied at terminal U whenever contacts 1CR2 of relay 1CR are closed. When a positive output pulse is received from pulse generator amplifier Z3C the same is impressed on the base of transistor Q10 which then turns on. DC current then flows from terminal U through winding PT1A and through the collector emitter path of Q10 to common. As a result, transistor Q9 turns on and there is a sharp rise in current through PT1A and the collector-emitter circuit of Q9 provides the sharp pulse depicted by the waveform in FIG. 8. When the current pulse form Z3C, which is typically 140 μsec. in duration, ceases Q10 turns off which also results in turn off at Q9. The resistor R55 and capacitor C13 provide RC decoupling of the amplifiers 44j from the +32 volts DC supply which allows for high peak gating currents when SCR1 is initially gated.

Pulse amplifier 44k, it will be understood, functions in a similar manner as aforedescribed in connection with amplifier 44j and supplies a series of high gating current pulses to the primary winding PT4A of gating transformer PT, during the conducting half cycles of thyristor SCR4.

It will be understood that the firing circuit modules 46 and 48 which control the firing of thyristors SCR2-SCR5 and SCR3-SCR6 respectively are duplicates of the module 44. The respective unscaled and scaled input terminals for modules 46 and 48 and their connections to the transformers PT10 and PT11 and scaling adjusters have been before described. The common command signal line 92 also has connection to the respective terminals BC and CD of modules 46 and 48 for the same control purpose as described in connection with comparator 44e. The corresponding terminals V in each of the + and − pulse amplifiers in modules 44, 46 and 48 are connected in parallel through a line 91 to the terminal Z, see FIG. 2a at the point common between contacts 1CR2 and 1CR3.

The firing circuit module 50 which controls the firing of SCR7 and SCR8 in the energizing circuit for eddy current brake 13 is also a duplicate of module 44. Module 50 has an unscaled AC input terminal EB1 which is connected through lines 94 and 96 to a 24 volt, constant frequency (60 Hz) AC input terminal 100a of the power supply module 100. A scaled AC input terminal EB is connected through a line 102 to output terminal EBA of an eddy current brake scaling circuit module 104 which is shown in detail in FIG. 7, and another scaled input terminal in module 50 is connected through a line 106 to another 24 volt, 60 Hz Ac terminal 100b of module 100. The AC voltages supplied at terminals 100a and 100b are 180° out-of-phase with respect to each other.

Figure 7:
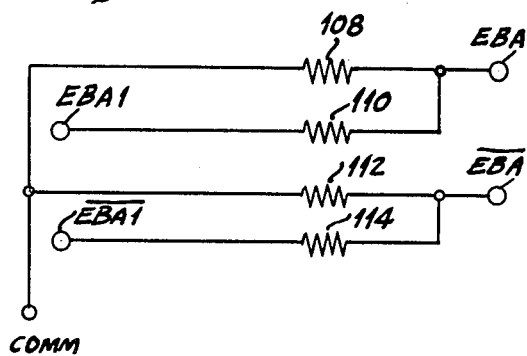
FIG. 7 is a diagram of the details of another sealing adjustment shown in FIGS. 2b and 2c.

The circuit arrangement of the scaling circuit 104 for the eddy current brake as shown in detail in FIG. 7 comprises fixed resistors 108, 110, 112 and 114. The resistors 108 and 110 are connected as voltage dividers between input terminal EB1A and common, and the resistors 112 and 114 are similarly between input and terminal EB1A and common. The output terminals EBA and EBA are connected to the midpoint between resistor 108-110 and 112-114 respectively. Current 104 reduces the scaled AC + and − voltage to amplitudes appropriate to the circuitry of module 50.

Module 50 may be assumed to function in the manner aforedescribed for firing circuit module 44. However, it will be understood that the unscaled and scaled AC input voltages to module 50 will be at the AC supply frequency of 60 Hz. As will hereinafter more fully be explained, a separate command input signal is supplied to module 50 through the line 93 to the input terminal EBD.

The portion of the control signal that generates the speed reference, speed error feedback, and control comman signal which are supplied to the firing circuit modules 44, 46, 48 and 50 will now be described.

CONTROL COMPARATOR

Figure 4A:
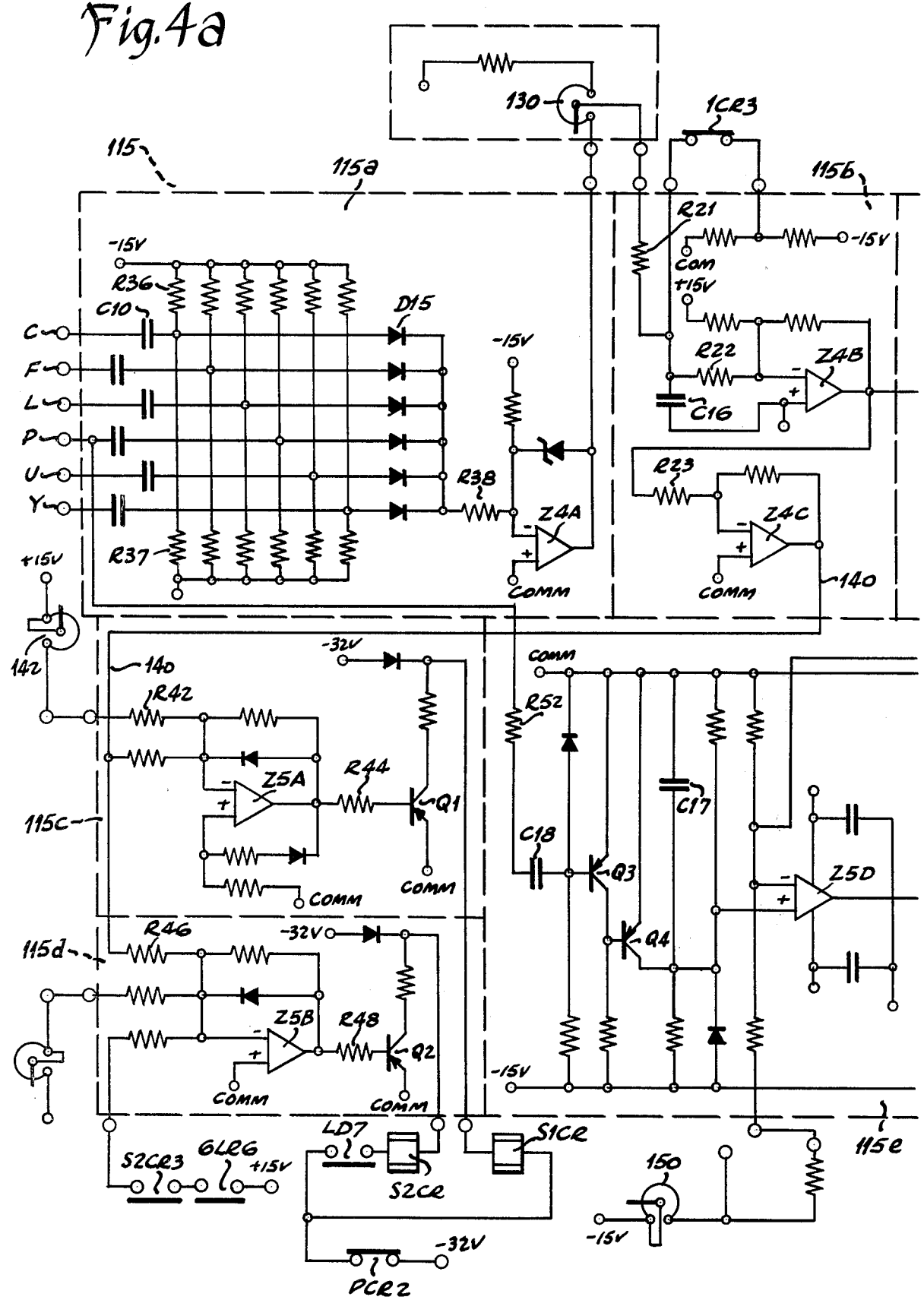
FIGS. 4a and 4b together form a diagram showing the comparator-regulator portion of FIGS. 2b and 2c in greater detail.
Figure 4B:
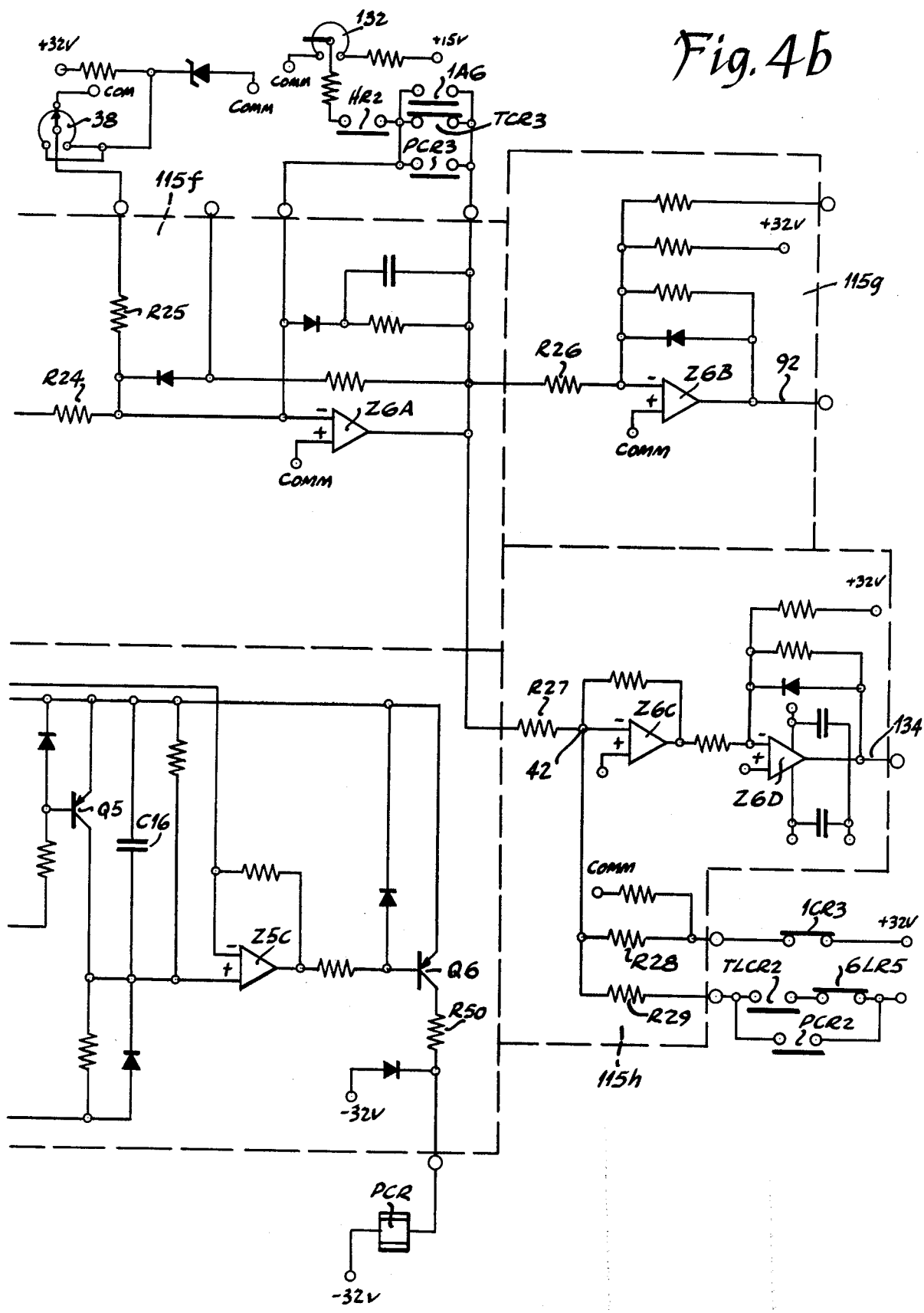

The comparator or regulator module 115 is shown in detail in FIGS. 4a and 4b. It performs the basic function of providing speed regulation command signals. More particularly, it provides: (1) feedback frequency signal generator, portion 115a of FIG. 4a, (2) feedback to voltage conversion, portion 115b, (3) speed relay detection for 40% and 80% speed, portion 115c and 115d, (4) plugging frequency detection, portion 115e, FIG. 4b, (5) speed error signal generator, portion 115f, and (6) firing circuit buffers for the rotor circuit, portion 115g and eddy current brake circuit, portion 115h.

Speed error signal generator 115f performs the basic function of comparing a reference voltage as set by the position of the master controller 15 acting through the reference potentiometer 38, and the feedback voltage as developed from the secondary frequency of motor 10. The difference between these two signals, via currents imposed through resistors R9 and R10 produce an error signal that is amplified by operational amplifier Z5A to provide a stable speed regulating signal voltage which varies between $-10$ and $+10$ volts.

As will hereinafter be explained in connection with the portion 115f, when the output voltage of Z5A varies from 0 to $-10$ volts the motor secondary SCR's firing is progressively advanced from 0° advance, or full retard, to 180° advance with a 5% change in motor speed. At 0 volts or less at the output terminal of Z5A conduction of the motor secondary SCRs will be fully cut-off. When the voltage output of Z5A varies in the range of 0 to 10 volts the firing angles of SCR7 and SCR8 in the eddy current brake energizing circuit will be progressively changed between full retard to 180° advance which occurs in lowering or plugging modes of motor operation.

The feedback frequency generator 115a has six input terminals C, F, L, P, U and Y which receive six SYNC signals S1, $\overline{S1}$, S2, $\overline{S2}$, S3 and $\overline{S3}$ respectively from the firing circuit modules 44, 46 and 48. As best shown in FIGS. 2b and 2c, SYNC signals S1 and $\overline{S1}$ are fed from module 44 through lines 116 and 118 to terminal C and F, SYNC signals S2 and $\overline{S2}$ are fed from module 46 through lines 120 and 122 to terminals L and P, and SYNC signals S3 and $\overline{S3}$ are fed from module 46 through lines 124 and 126 to terminals U and Y of generator 115a.

Figure 9:
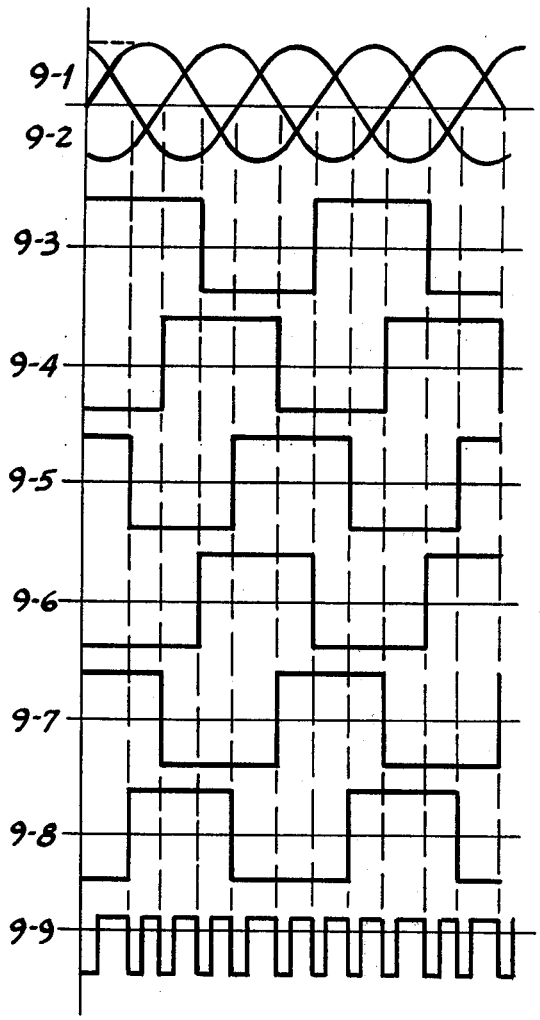

As shown in FIG. 9, the waveform 9-2 to 9-6 depict the square waveforms of the aforementioned six SYNC signals that are fed into generator in relation to the fundamental sinusoided voltage waveforms 9-1 appearing at the motor secondary terminal. Each SYNC voltage appearing at an input terminal of generator 115a is differentiated in a circuit comprising a pair of resistors R36 and R37 connected as a voltage divider between common and $-15$ volts DC, a capacitor C10, which is connected between its input terminal the point common between the associated voltage divider resistors, and in series with a diode, such as diode D15, and the resistor R38 to the inverting input of operational amplifier Z4A. Each such SYNC voltage is offset such that every positive leading edge of each sync waveform results in a negative voltage at the inverting input to amplifier Z1A. The frequency waveform 9-7 of FIG. 9 shows the resulting pulse waveform which varies typically between $+0.5$ and $-9.1$ volts, and which has a frequency six times that of the fundamental motor secondary frequency, or 360 Hz at zero motor speed.

The output of amplifier Z4A is connected to a feedback adjust potentiometer 130 which has its adjustable slider connected in series with resistors R21 and R22 to the invert input of amplifier Z4B in feedback frequency to voltage generator 115b. A capacitor C16 connected between the non-invert input of amplifier Z4B acts with the latter as a pulse integrator. The feedback adjust potentiometer permits a one time adjust to provide 0 volts output of amplifier Z4B when motor 10 is at a zero speed stall condition. Then the output voltage of amplifier Z4B will range from 0 to 10 volts corresponding to change in speed of motor 10 from 0 to 100% speed. The output of amplifier Z4B is connected through a resistor R23 to the invert input of an amplifier Z4C which has its output to the input of the speed relay detectors 115c and 115d. The output of Z4B is also connected to the speed error signal generator 115f through a resistor R24 to the inverting input of amplifier Z6A.

The adjustable slider of reference potentiometer 38, which as aforedescribed is adjusted in accordance with the operating positions of master controller 15 is connected in series with a resistor R25 to a summing point between resistor R24 and the invert input of amplifier Z6A. A minimum speed adjust potentiometer 132 has its slider connected in series with contacts HR2 of relay HR to the last mentioned summing point. With the master controller 15 in the 1st hoist position, and contacts HR2 closed the slider of potentiometer 132 is preferably adjusted so that the output of Z6A will cause the motor 10 to just hold the load on the hook and hoisting cable when the holding brake 12 is released.

When the controller 15 is at its "off" position contacts TCR3 will be closed thereby directly connecting the output of Z6A to its invert input to bias the latter off. The same action occurs when contacts 1A6 are closed in any of the 4th to 6th hoist positions of controller and whenever the contacts PCR3 are closed under "plugging" mode of motor operation. This insures that the motor secondary thyristors will not be triggered into conduction when motor 10 is at rest, in the "open loop" or in the "plugging" modes of motor operation.

MOTOR ROTOR CIRCUIT OUTPUT BUFFER

The output of speed error amplifier Z6A is fed through a resistor R26 to the invert input of buffer amplifier Z6B which has its output connected to command line 92 which is connected to corresponding input terminal of the firing circuit modules 44, 46 and 48 as aforedescribed. As the output of speed error amplifier Z6A varies between 0 and $-10$ volts the inverted output of buffer amplifier will vary between $-8.8$ and $+0.5$ volts with the latter voltage providing full advance firing of the motor secondary SCRs.

EDDY CURRENT BRAKE CIRCUIT OUTPUT BUFFER

The output of speed error amplifier Z6A is also connected through a resistor R27 to the invert input of an inverter Z6C which is in turn connected to the invert input of an amplifier Z6D. The output of Z6D is connected through a line 134 to the input terminal EBD of the eddy current brake firing circuit module 50. When the output voltage of speed error amplifier Z6A varies from 0 to $+10$ volts, the amplifier Z6C acts as an inverter to provide a 0 to $-10$ volt output to the invert input of amplifier Z6D which provides an output voltage varying between $-8.8$ and $+0.5$ volts. SCR7 and SCR8 in the eddy current brake energizing circuit will thus vary from full off to full on when the output voltage of amplifier Z6D varies as indicated.

Whenever the master controller 15 is in the OFF position relay 1CR will be deenergized and its contacts 1CR3 will then be closed and will be connected to the terminal Z. As aforedescribed terminal Z is connected through line 92, see FIGS. 2a to 2c, to the terminal U of the six pulse amplifiers of firing circuit modules 44, 46 and 48. With the capacitor C13 in each of the six pulse amplifiers effectively connected in parallel, +32 volts is initially applied to the summing point 42 through line 136 and resistor R28 which causes amplifier Z6D to be fully saturated so that the eddy current brake will be fully energized to effect rapid slow down of the motor to zero speed and thus assist the holding brake 12 in bringing the motor to rest. The capacitors C13 will discharge causing the voltage applied to summing point to decrease, thereby causing the eddy current brake SCR7 and SCR8 to be turned off within a short time delay period.

The normally closed contacts 6LR5 of relay 6LR and normally open contacts TLCR2 of relay TLCR2 are connected in series to the +15 volt supply terminal and in series with a resistor R29 and a line to the aforementioned summing point. The normally open contacts PCR2 of plugging relay PCR are connected in parallel across the contact TLCR2 and 6LR5.

Referring to FIG. 1c, it will be understood that relay 6LR will be energized to close its contacts 6LR4 and open its contact 6LR5 whenever the master controller 15 is in its 6th lowering position, and as a result relay TLCR will be energized to close its contacts TLCR1 whenever the motor speed in the lowering direction exceeds 80% rated speed to effectively energize relay S2CR and close its contacts S2CR1 and S2CR2. Accordingly with contacts 6LR5 open the +15 volts will not be applied through line 138 to summing point, and the eddy current brake SCR7 and SCR8 thyristor will then be biased fully off as the output of speed error amplifier Z6A will simultaneously be at 0 volts output because contacts 1A6 will then be closed between the output and invert input of Z6A.

Now, when controller 15 is moved back from 6th to any of its lower numbered "lower" operating positions relay 6LR drops out resulting in immediate reclosure of its contacts 6LR5. Until the motor decreases below 80% speed in the lowering direction contacts S2CR2 remain closed thereby maintaining relay TLCR energized which then maintains its contacts TLCR2 closed until relay S2CR deenergizes upon motor slow down below 80% lowering speed. During the interval when contacts TLCR2 and 6LR5 are both closed +15 volts is applied through line 138 and resistor R29 to summing point 42 to insure full advance conduction of the eddy current brake thyristors SCR7 and SCR8.

The full eddy current brake energization occurs only for the transient period required for the motor to slow down 80% base lowering speed. When relay S2CR drops out it opens its contacts S2CR1 which results in dropout of contactor 1A and reopening of its contacts 1A6 which enables speed error amplifier Z6A to regain control over the motor secondary thyristor and eddy current brake thyristor firing circuits.

When contacts PR2 close as a result of energization of plugging relay PCR, eddy current brake thyristor SCR and SCR8 will likewise be fully energized until the motor speed in the lowering direction decreases to 20% (72 Hz) of base speed.

SPEED RELAY DETECTION CIRCUITS

The portion 115c of FIG. 4a shows the detection and amplifier circuit for the relay S1CR which as before indicated functions whenever the motor speed in either hoist or lower direction reaches 40% or more of base speed. As shown, a line 140 is connected from the output of inverter Z4C in series with a resistor R42 to the inverting input of amplifier Z5A which has its output connected in series with a resistor R44 to the base of a P-N-P transistor Q1. The inverting input of Z5A also has connection through resistor R42 to an adjust potentiometer 142 which permits adjustment of the motor speed at which transistor Q1 will trigger on the energize relay S1CR. S1CR is connected in the emitter-collector circuit of Q1 between common and −32 volts. It will be apparent that relay S1CR can only energize when the contacts PCR2 of the plugging relay PCR are closed. Thus relay S1CR can be energized any time the motor reaches 40% rated speed and the controller 15 is not calling for plugging operation.

The 80% speed relay S2CR portion 115d has connection from inverter Z4C through line 140 and a resistor R46 to the inverter input of amplifier Z5B an adjust potentiometer is connected through resistor R46 to the invert input of Z5B, and permits the adjustment of the saturation point of Z5B. The output of Z5B is connected through a resistor R48 to the base of a transistor Q2. Relay S2CR is connected in the emitter-collector circuit between common and −32 volts in series with normally open contacts LD7 of contactor LD and the aforementioned contacts PCR2 of relay PCR. Thus relay S2CR can only be energized when controller 15 is operated to one of its lower operating positions and the plugging relay PCR is deenergized.

PLUGGING RELAY DETECTOR, AMPLIFIER DRIVER CIRCUIT

This circuit is shown in detail in the portion 115e of FIGS. 4a and 4b. Plugging relay PCR is connected in series with the emitter-collector circuit of a transistor Q6 and a resistor R50 between common and −32 volts. PCR will of course be conducting whenever transistor Q6 is turned on. Turn-on of Q6 requires that the output of operational amplifier Z5C goes negative. In order for amplifier Z5C output to go negative the potential on its non invert input must go below the potential on its invert input which is fixed, but adjustable in accordance with the setting of the slider on PCR adjust potentiometer 150.

The level of voltage on capacitor C16 determines whether the non invert input to Z5C decreases below that on its invert input. Capacitor C16 charges whenever transistor Q5 is off and discharges whenever the latter is conducting. Q5 will be off when the output of detector amplifier Z5D is positive and will be conducting whenever the output of the latter is negative. The invert input to Z5D is fixed but adjustable through potentiometer 150 in the same manner as the corresponding input to amplifier Z5C. The potential to which the non invert input of Z5D is subjected depends upon the potential to which the capacitor C17 is charged at any given time. This is controlled by the on-off periods of the transistors Q3 and Q4.

The base of transistor Q3 is connected in series with a capacitor C18 and R52 to input terminal P of the feedback frequency generator, portion 115a. Consequently, capacitor C18 differentiates the square wave $\overline{S2}$ SYNC-signal, thereby causing transistor Q3 to cycle on-and-off in accordance with the frequency of such differentiated signal input on capacitor C18. Conduction of Q3 in turn causes transistor Q4 to conduct which causes capacitor C18 to discharge abruptly through the emitter-collector current of Q4 thereby resulting in a less negative potential on the invert input to Z5D.

With the frequency of the square wave SYNC-signal $\overline{S2}$ below 72 Hz in frequency, the time ratio of on-to-off of transistor Q5 will regulate the voltage level on capacitor C16 to a point preventing the potential on the non invert input of Z5C to decrease below that on its invert input. Consequently Q6 will be held non conducting to prevent energization of relay PCR. On the other hand, when the SYNC-signal $\overline{S2}$ goes above 72Hz in frequency the time ratio of on-to-off of Q5 will increase to a point which allows the potential charge on capacitor C16 to rise to a point causing the potential on the non invert input to Z5C to decrease below that on its invert input thereby causing Q6 to conduct and energize relay PCR.

As will be understood, the exact frequency of the SYNC-S2 signal at which energization of relay PCR occurs can be adjusted within limits in accordance with the setting of potentiometer 150. In the preferred embodiment it has been found that deenergization of relay PCR is desirable when the motor speed in the plugging mode decreases below 20% rated speed which corresponds to a motor secondary frequency of 72 Hz.

While the preferred embodiment relates specifically to a wound rotor motor as applied to a hoist system employing an eddy current retarding brake, the teachings of this invention and the scope of the appended claims are not so limited. It will be understood that this invention has application to AC wound rotor motors both in reversing and non-reversing drive systems which do or do not apply eddy current retarding brakes.

We claim:

1. The combination with a polyphase A.C. wound rotor motor having opposed parallel connected controlled thyristors and a plurality of series connected resistors in each leg of a delta connected secondary impedance network and control means for establishing A.C. power connections to the motor primary terminals, of means for controlling the conduction of said thyristors in each leg of the delta connected secondary impedance network comprising means connected to the motor secondary terminals to provide polyphase A.C. reference signals which vary in frequency and amplitude in accordance with motor primary excitation, speed and load, means responsive to said A.C. reference signals providing polyphase complementary constant peak amplitude, variable frequency signals which are impervious to erroneous multiple zero crossings of said A.C. reference signals, means providing a selectively settable reference signal, and means responsive to the last mentioned reference signal and said polyphase complementary constant peak amplitude variable frequency signals to provide timed gating signals for initiating conduction of said thyristors.

2. The combination according to claim 1 wherein the first mentioned control means includes means manually operable to a plurality of different operating positions and having connection with said means providing a selectively settable reference signal to effect predetermined magnitudes of the last mentioned reference signal in accordance with its operating position.

3. The combination according to claim 2 wherein said manually operable means in certain positions establishes power connection to the motor starter for effecting one direction of motor operation and in other positions establishes power connections for the motor operation in the opposite direction.

4. The combination according to claim 3 together with an eddy current retarding brake coupled to said motor, means for variably energizing the control winding of said brake, and means responsive to said manually operable means being in certain of said other positions for rendering said means for variably energizing said brake control winding effective.

5. The combination according to claim 3 wherein said means for variably energizing said control winding of said brake includes controlled thyristors, and means responsive to said selectively settable reference signal and constant frequency signals for controlling the gating of the last mentioned controlled thyristors.

6. The combination with a polyphase A.C. wound rotor motor having opposed parallel connnected controlled thyristors and a plurality of series connected resistors in each leg of a delta connected secondary impedance network and control means for establishing A.C. power connections to the motor primary terminals, of means for controlling the conduction of said thyristors in each leg of said delta secondary impedance network comprising:
(a) means connected to the motor secondary terminals to provide polyphase A.C. reference signals which vary in frequency and amplitude in accordance with motor primary excitation, speed and load,
(b) means responsive to said A.C. reference signals and providing for each leg of said secondary impedance network, a pair of complementary constant amplitude, variable frequency square wave synchronization signals,
(c) means responsive to said A.C. reference signals and said synchronization signals and providing for each leg of said secondary impedance network, a pair of integrated complementary constant peak amplitude, variable frequency signals,
(d) means responsive to pairs of the last mentioned signals and associated ones of said square wave synchronization signals to provide for each leg of said secondary impedance network synchronization lock signals which prevent said synchronization signals from recognizing erroneous multiple zero crossings of said A.C. reference signals.
(e) means providing a selectively settable reference signal, and
(f) means responsive to the last mentioned reference signal and the polyphase complementary constant peak amplitude, variable frequency signals to provide timed gating signals for initiating conduction of said thyristors.

7. The combination according to claim 6 wherein the last specified means includes means which respond to said synchronization signals to provide an integrated motor speed feedback signal, and further includes means responsive to the algebraic resultant of said motor speed feedback signal and said selectively settable reference signal to provide gating signals for initiating conduction of said thyristors in each leg of said secondary network at corresponding times in their conducting half cycles.

8. The combination according to claim 7 wherein the first mentioned control means includes a manually operated controller for establishing A.C. power connections to the motor primary terminals whenever operated from an off position to anyone of a plurality of preset positions in either direction to afford operation of said motor in reverse directions in accordance with the direction of operation of said controller from said off position, and wherein means are provided to be responsive to said motor speed feedback signal attaining a given value in one direction of motor operation and said controller is in a certain position or others therebeyond in one direction from said off position to shunt said thyristors and said series resistors effectively out of circuit in each leg of said secondary impedance network.

9. The combination according to claim 8 together with means which is responsive to said motor speed feedback signal attaining another given value in the opposite direction of motor operation and said controller is in another certain position in the opposite direction of motor operation to shunt said thyristors and all series resistors effectively out of circuit in each leg of said secondary impedance network.

10. The combination according to claim 9 together with an eddy current retarding brake coupled to said motor, and means including a pair of controlled thyristors for supplying the energizing winding of said brake with rectified unidirectional current, and means responsive to said controller being in any of its operating positions other than said other certain position to control the conduction of said thyristors in accordance with said motor speed feedback signal.

11. The combination according to claim 9 together with means responsive to the motor operating under plugging motor secondary frequency conditions to render said motor secondary impedance network thyristors non conducting and said eddy current brake thyristors fully conducting pending slow down of the plugged motor to a predetermined slow speed.

12. The combination according to claim 9 together with a motor shaft holding brake having an electro response release winding which is energized whenever said controller is out of its off position and means which insures maintenance of said eddy circuit thyristors conducting for a predetermined interval following operation of said controller to its off position for any operating position in said opposite direction to assist said holding brake in bringing said motor to rest.

13. The combination in a hoist system driven by a polyphase A.C. wound rotor which has opposed parallel connected controlled thyristors and a plurality of series connected resistors in each leg of a delta connected secondary impedance network, and has an eddy current retarding brake coupled to the motor shaft, of control means comprising:

(a) a manual controller which has an off position and a plurality of positions on opposite sides of said off position, said controller when operated to any of its positions on one side of off establishing power connections to the motor primary terminal to cause said motor to run in the hoist direction, and when operated to any of its positions on the other side of off establishing lowering power connection to said primary terminals, (b) means responsive to said positions of said controller to provide a speed reference signal which changes with the controller positions, (c) means connected to the motor secondary terminals to provide polyphase A.C. motor speed feedback signals which vary in frequency and amplitude in accordance with motor primary excitation, speed and load (d) means responsive to said feedback signal to provide polyphase complementary constant peak amplitude variable frequency signals which are unaffected by erroneous multiple zero crossings of said feedback signals for a given period beyond the first such crossing in each half cycle, and (e) means responsive to the last mentioned signals, said speed reference signal, and said speed feedback signals to provide timed gating signals for initiating conduction of said thyristors.

14. The combination according to claim 13 wherein means are provided for controlling the current supplied to the energizing winding of said eddy current retarding brake includes a pair of controlled thyristors and means responsive to said controller being in certain positions providing operation of said motor in the lowering direction to control the conduction of said last mentioned thyristors in accordance with the magnitude of said speed feedback signal and signals of constant frequency.

15. The combination according to claim 14 together with means responsive to motor secondary frequency exceeding a predetermined value when the controller is operated to provide plugging power connections to the primary terminals to render the motor secondary thyristor non conducting and said eddy current brake thyristors fully conducting pending motor slow down to a speed affording return of the secondary frequency to or below said predetermined value.

* * * * *